United States Patent [19]

Glöersen

[11] Patent Number: 4,954,219

[45] Date of Patent: * Sep. 4, 1990

[54] METHOD FOR TRANSFERE OF FIRROUS MATERIALS TRANSPORT BY LIQUIDS

[75] Inventor: Stig Glöersen, Karlstad, Sweden

[73] Assignee: Beloit Corporation, Beloit, Wis.

[*] Notice: The portion of the term of this patent subsequent to Mar. 14, 1995 has been disclaimed.

[21] Appl. No.: 233,978

[22] Filed: Aug. 18, 1988

Related U.S. Application Data

[63] Continuation of Ser. No. 823,840, Jan. 31, 1986, abandoned, which is a continuation of Ser. No. 387,474, Jun. 11, 1982, abandoned, which is a continuation of Ser. No. 184,407, Nov. 2, 1979, abandoned.

[30] Foreign Application Priority Data

Mar. 2, 1978 [SE] Sweden ............................... 7802408

[51] Int. Cl.$^5$ .......................... D21C 7/08; D21C 7/14; D21C 9/02; D21C 11/00
[52] U.S. Cl. ......................................... 162/41; 162/47; 162/52; 162/60
[58] Field of Search .................... 162/19, 30.1, 52, 60, 162/61, 233, 241, 246, 47, 41

[56] References Cited

U.S. PATENT DOCUMENTS

| | | | |
|---|---|---|---|
| 3,258,390 | 6/1966 | Thomlinson, II | 162/52 |
| 3,294,623 | 12/1966 | Brinkley, Jr. et al. | 162/60 |
| 3,537,953 | 11/1970 | Brown et al. | 162/52 |
| 4,057,461 | 11/1977 | Richter | 162/52 |
| 4,078,964 | 3/1978 | Gloersen | 162/52 |
| 4,100,016 | 7/1978 | Diebold et al. | 162/16 |
| 4,123,318 | 10/1978 | Sherman | 162/60 |
| 4,138,311 | 2/1979 | Neno | 162/52 |
| 4,284,120 | 8/1981 | Gloersen | 162/52 |

*Primary Examiner*—Steve Alvo
*Attorney, Agent, or Firm*—Dirk J. Veneman; Raymond W. Campbell

[57] ABSTRACT

Method for transferring fibrous materials transportable with a liquid between various treatment stages, preferably from digesting (10-16) to a subsequent treatment (38) by means of circuits of circulating liquid. Material from one or several discontinuous treatment steps (10-16) are supplied to a subsequent continuous treatment step the material being fed into the continuous step (38) by displacement by means of a liquid portion (36) withdrawn from the said step.

8 Claims, 1 Drawing Sheet

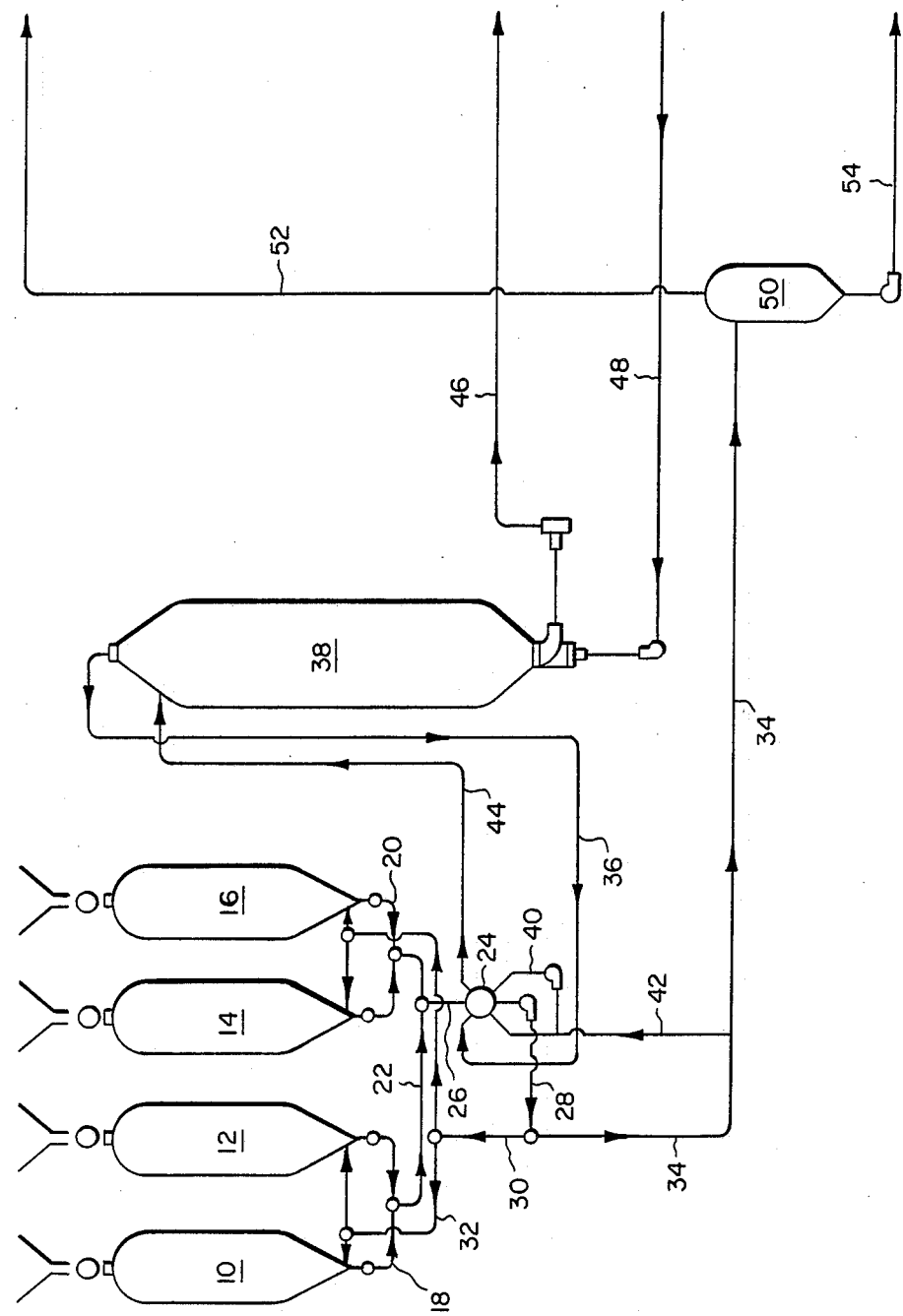

METHOD FOR TRANSFERE OF FIRROUS MATERIALS TRANSPORT BY LIQUIDS

This Application is a continuation of copending Ser. No. 823,840 filed Jan. 31, 1986, now abandoned; which is a continuation of Ser. No. 387,474 filed Jun. 11, 1982, now abandoned; which is a continuation of Ser. No. 184,407 filed Nov. 2, 1979, now abandoned.

The present invention is concerned with a method of transfer of fibre material from one circuit of circulating liquid to another, where the fibre material is transported via circuit lines connected to a rotary feed valve.

For coupling together various treatment vessels in processes for treatment of fibre materials it is known to use rotary feed valves for the transfer of the material. In this connection, the transfer is effected by the rotary feed valve having a rotor formed with one or several pockets which rotor is brought into various positions where connection is established between circuit lines connected to the vessels.

The object of the present invention is to make available a method of the said kind which permits to couple several discontinuously operated treatment vessels with a continuous process so as to obtain the greatest possible yield from the process.

This is achieved by endowing the method of the invention with the characteristic features stated in the appended claims.

BRIEF DESCRIPTION OF THE DRAWING

The invention shall hereinafter be described nearer in conjunction with the appended drawing, which illustrates an embodiment of a system in which the method of the invention is applied. The FIGURE shows diagrammatically an overall view of a digester house with a rotary feed valve attached therebehind for transfer of fibre material from the digesters to a detached washing vessel.

In the FIGURE, 10, 12, 14 and 16 denote treatment vessels for chip material, preferably digesters, into which the material is fed at the top from a hopper, not labelled, and is discharged at the bottom after the finished treatment. The digesters 10-16 are of the so-called discontinuous type, i.e. the material is discharged in batches.

According to the invention, the discharge from the digesters are by lines 18 and 20, respectively coupled together in pairs and by a common line 22 connected to an outlet of a rotary feed valve 24. This rotary feed valve has in the shown embodiment six outlets as is described more completely and in Swedish patent application No. 7609782-3 which corresponds to U.S. Pat. No. 4,284,120. The line which is connected to the rotary feed valve 24 from the outlet line 22 is denoted 26. For the sake of simplicity it is assumed in the subsequent description that the rotary feed valve 24 has one pocket which in the shown embodiment will take three positions of operation.

In the first position, the pocket stands vertically and thus connects the line 26 from the digesters 10-16 with the line 28 which starts from the diametrically opposed side of the rotary feed valve 24. As is disclosed in the above cited U.S. Pat. No. 4,284,120 the housing of the rotary feed valve is, at the outlet side towards the line 28, provided with a screen, and when the pocket takes the aforestated first position fibre material and cooking liquor will thus be fed from the line 26 into the pocket of the rotary feed valve 24, whereby the pocket is filled with the fibre material and cooking liquor whereas the liquor content of the pocket from the third position, further discussed below, flows out through the screen and into the line 28 which is equipped with a pump. The liquor drawn off into the line 28 may partly be returned through lines 30 and 32 to the digesters, and partly through a line 34 to further treatment as will be described further below.

The rotary feed valve 24 which rotates in clockwise direction, will thereupon bring its pocket into a second position where a circuit line 36, from the detached washing vessel 38, is connected with a circuit line 40 equipped with a pump, not labelled. In this position, the possible remainder of cooking liquor is displaced by washing liquor which is supplied in the line 36, the cooking liquor flowing out into the line 40 which is connected to a line 42 leading to the line 34 which also contains cooking liquor. In the line 34, there is thus a flow of both cooking liquor from the discontinuous treatment and washing liquid from the continuous treatment.

In the third position of the rotary feed valve, the line 40 is connected to a line 44 which is attached to the top of the washing vessel 38. Hereunder, the liquid supplied through the line 40 will displace fibre material and liquor in the rotary valve into the washing vessel 38 through the line 44, while simultaneously the pocket of the rotary valve 24 is filled with liquid from the continuous treatment stage.

From the washing vessel 38 the fibre material is removed through a line 46 to further treatment, for example refining and/or treatment with oxygen gas, a treatment in 2 steps, which is described more completely in U.S. application Ser. No. 18016 filed Mar. 3, 1979, now abandoned. Possible exhaust liquid from the further treatment can be recycled to the washing vessel 38 via a line 48.

That liquid which is not returned to the digesters 10-16 or the circulation of the rotary feed valve 24 is removed through the line 34 to evaporation, for example (not shown). It may also, as in the shown embodiment, be fed into a receptacle 50 where possible residual gases are expelled and removed through a line 52, while tapped liquor from the receptacle 50 is withdrawn for evaporation, for example, through a line 54.

It is evident from the above that it is possible by periodically in turn connecting the discontinuously operated digesters 10-16 to a detached washing vessel 38 via the rotary feed valve 24, to cause a discontinuous digester house to operate continuously behind the rotary feed valve, the fibre material thereunder passing a layer of liquid, as is described in U.S. application Ser. No. 785,543 filed Apr. 7, 1977, now abandoned.

It is clear that the shown embodiment is an example only of the realization of the invention and that the same can be varied within the scope of the appended claims without departing from the inventive idea.

It is especially emphasized that the used rotary feed device can be formed in various manners as also is shown and described in the U.S. Pat. No. 4,284,120, cited above, and that the rotary feed device is provided with the required screen means for its function, as also is evident from U.S. Pat. Nos. 4,033,811 and 4,078,964.

I claim:

1. A method for transporting and treating fiber material between a discontinuous pulp digesting process and a continuous washing station, which method comprises the steps of:

obtaining a mixture of a fiber material and cooking liquor from at least one discontinuous pulp digesting process for the purpose of separating the fiber material from the cooking liquor to separately transfer said fiber material to the continuous washing station and the cooking liquor to further processing;

displacing the cooking liquor from the fiber material using a first volume of washing liquid from said washing station, thereby obtaining a mixture of said fiber material and said first volume of washing liquid;

displacing and transporting said mixture of said first volume of washing liquid and said fiber material to the washing station using a second volume of washing liquid as a transport liquid;

returning a portion of said cooking liquor displaced by said first volume of washing liquid to said at least one discontinuous cooking digester; and removing a portion of said cooking liquor displaced by said first volume of washing liquid to utilize the heat content of said second mentioned portion for evaporation.

2. The method of claim 1 including the step of collecting said mixture of fiber material and cooking liquor in a rotary valve.

3. The method of claim 2, wherein said obtaining step and both of said displacing steps are performed in said rotary valve.

4. A method for transporting and treating fiber material, which comprises:

introducing a fiber material and cooking liquor into a first liquid circuit from at least one discontinuous cooking digester;

transferring said fiber material via said at least one liquid circuit to a continuous washing station, said fiber material being displaced to said continuous washing station by providing a rotary valve in the first liquid circuit;

introducing fiber material and cooking liquor into the rotary valve;

displacing the cooking liquor with washing liquor from said washing station;

transporting the fiber material in a second liquid circuit to the washing station by introducing said displaced cooking liquor into the rotary valve to remove the fiber material.

5. The method of claim 4, wherein liquid is extracted from said discontinuous cooking digesters and the heat content of said extracted liquid is used for evaporation.

6. The method of claim 4, wherein said rotary valve comprises three circuits.

7. A method for transporting fibrous material from a plurality of discontinuous digesters to a continuous fiber washing apparatus comprising the steps of:

obtaining from the digesters successive batches of digested fiber material and cooking liquor;

utilizing a first volume portion of washing liquid from said washing apparatus to displace cooking liquor from the digested fiber material;

transporting the displaced cooking liquor to further treatment including the utilization of heat contained therein; and utilizing a second volume portion of washing liquid from said washing apparatus for transporting the digested fibrous material having the cooking liquor displaced therefrom to said continuous washing apparatus.

8. A method for transporting fibrous material from a plurality of discontinuous digesters to a continuous fiber washing apparatus as defined in claim 7, including the step of:

circulating at least a portion of the cooking liquor displaced from the fibrous material to a digester to be utilized with a subsequent batch of fiber material.

* * * * *